(12) United States Patent
Russell (10) Patent No.: US 9,182,319 B2
(45) Date of Patent: Nov. 10, 2015

(54) AUTOMATIC DETECTION AND ANALYSIS OF TIRE TREADS

(71) Applicant: XSENSOR Technology Corporation, Calgary (CA)

(72) Inventor: Terence Russell, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 183 days.

(21) Appl. No.: 13/912,065

(22) Filed: Jun. 6, 2013

(65) Prior Publication Data

US 2013/0327135 A1  Dec. 12, 2013

Related U.S. Application Data

(60) Provisional application No. 61/657,551, filed on Jun. 8, 2012.

(51) Int. Cl.
*G01M 17/02* (2006.01)
*B60C 23/10* (2006.01)
*B60C 29/00* (2006.01)

(52) U.S. Cl.
CPC .................................. *G01M 17/02* (2013.01)

(58) Field of Classification Search
None
See application file for complete search history.

(56) References Cited

U.S. PATENT DOCUMENTS

| | | | | |
|---|---|---|---|---|
| 5,174,151 A * | 12/1992 | Adachi et al. | | 73/146 |
| 5,347,588 A | 9/1994 | Wilson | | |
| 6,176,127 B1 * | 1/2001 | Kim | | 73/146 |
| 6,868,358 B2 * | 3/2005 | Brown, Jr. | | 702/138 |
| 7,082,819 B2 * | 8/2006 | Thiesen et al. | | 73/146.5 |
| 7,114,383 B2 * | 10/2006 | Byrne | | 73/146 |
| 7,464,586 B2 * | 12/2008 | Kabe et al. | | 73/146 |
| 7,469,579 B2 * | 12/2008 | Iwase et al. | | 73/146 |
| 7,523,655 B2 * | 4/2009 | Braghiroli | | 73/146 |
| 7,832,263 B2 * | 11/2010 | Rensel et al. | | 73/146 |
| 7,975,540 B2 * | 7/2011 | Angell et al. | | 73/146 |
| 8,037,744 B2 * | 10/2011 | Hanada et al. | | 73/146 |
| 8,793,109 B2 * | 7/2014 | Sotgiu et al. | | 703/6 |
| 2010/0274447 A1* | 10/2010 | Stumpf | | 701/36 |
| 2014/0303908 A1* | 10/2014 | Sotgiu et al. | | 702/41 |

* cited by examiner

*Primary Examiner* — Peter Macchiarolo
*Assistant Examiner* — Jermaine Jenkins
(74) *Attorney, Agent, or Firm* — Fenwick & West LLP (57) ABSTRACT

A pressure sensor is used to automatically calculate physical parameters of a tire, for example, groove area fraction or shoulder center ratio. In one approach, a pressure sensor measures the pressure distribution produced by a tire when a known load is applied to the tire while it is resting on or traversing the pressure sensor. The resulting pressure map corresponds to tread area and features of the tread contact area.

20 Claims, 10 Drawing Sheets

FIG. 16

AUTOMATIC DETECTION AND ANALYSIS OF TIRE TREADS

CROSS-REFERENCE TO RELATED APPLICATION(S)

This application claims priority under 35 U.S.C. §119(e) to U.S. Provisional Patent Application Ser. No. 61/657,551, "Automatic Detection and Analysis of Tire Treads," filed Jun. 8, 2012. The subject matter of the foregoing is incorporated herein by reference in its entirety.

BACKGROUND OF THE INVENTION

1. Field of the Invention

The invention relates generally to the automatic detection and analysis of tire treads, and more specifically to automatic detection and analysis using a pressure mapping system.

2. Description of the Related Art

Tire performance research and design has for many years involved the analysis of the tire tread with respect to the contact surface that the tire is resting upon. This typically involves analyzing contact pressures and tread deformations for both static and rolling tires. Before pressure mapping products were available, this analysis was restricted to the examination of tread deformation and tread physical parameters using manual techniques such as applying ink to the tread and rolling the tire across construction paper to record the tread footprint. Others have attempted to improve the crude nature of these approaches.

For example, published application US2010/0274447 describes the use of transducer matrix film for measuring tire tread pressures. The measurements may be used for tire testing and evaluation purposes or as part of a safety or performance feedback system. However, the system requires considerable manual effort to extract the required data.

U.S. Pat. No. 8,037,744 describes a method of analyzing tire treads using CCD camera technology. A tire tread is applied to a transparent faceplate and cameras capture images for further processing and analysis. However, this system is limited in that it does not capture pressure data and only analyzes one tread at a time.

U.S. Pat. No. 5,347,588 describes another optical imaging system that analyzes a tire footprint on a transparent planar surface. Image processing of the captured images is used to identify various tread parameters. However, this system has only coarse capabilities and it is not capable of measuring pressure.

Thus, there is a need for approaches that can perform surface pressure measurements in addition to automatically measuring various physical parameters for tire treads.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

A pressure sensor is used to automatically calculate physical parameters of a tire, for example, groove area fraction or shoulder center ratio. In one approach, a pressure sensor measures the pressure distribution produced by a tire when a known load is applied to the tire while it is resting on or traversing the pressure sensor. The resulting pressure map corresponds to tread area and features of the tread contact area.

In one approach, the pressure map is processed to locate and loosely frame the tire tread image with a bounding box. The bounding box is rotated to align with the orientation of the tire on the pressure sensor. The sides of the bounding box are advanced toward the center of the tire tread until they contact the tread edges. The result is a tightly framed tire tread pressure image that permits the calculation of physical parameters such as contact area and the groove area fraction measurement. Features of the tire tread such as center and shoulder rib lines can also be derived with additional processing. The center and shoulder rib line lengths can be used to calculate the shoulder center ratio. By framing and identifying key features of the tire tread, other physical and pressure measurements can be performed and distinct features such as individual tread ribs can be isolated, measured, and analyzed separately.

Figure 1:
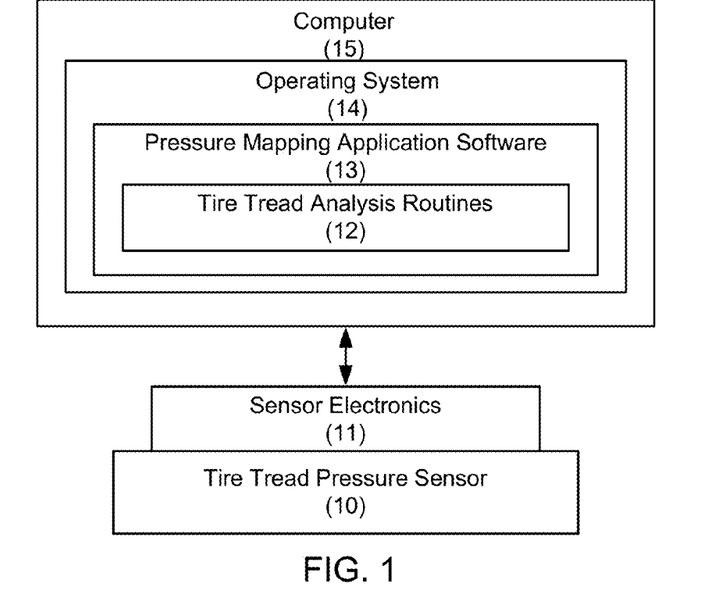
FIG. 1 is a diagram of a pressure mapping system.

The system shown in FIG. 1 includes three major components: the tire pressure sensor (10), the sensor electronics unit (11), and the computer (15). The computer includes software subcomponents, including the operating system (14), the application software (13), and the tire tread analysis routines (12).

TIRE SENSOR. The tire pressure sensor (10) can come in various sizes to suit a wide range of applications. For example, automotive and light truck tires support sensing areas ranging from 12"×12" to 30"×30" or preferably 16"×16" or 22"×22". Tire sensors for larger vehicles such as heavy trucks, agricultural and industrial vehicles, and even mining trucks and aircraft tires, have sensing areas in the range of 30"×30" to 72"×72" or preferably 36"×36". Rectangular sensing areas are also possible, for example, 16"×32", 22"×44", 30"×72", or preferably 36"×72".

The tire pressure sensor (10) contains an array of individual sensors. The tire sensor resolution is typically 0.050" to 0.500" pitch, or preferably 0.0625", 0.086", or 0.100" pitch. A sensel is an individual sensor within the sensor array. Tire sensor arrays are typically 64 sensels×64 sensels to 512 sensels×512 sensels, or preferably 192 sensels×192 sensels or 256 sensels×256 sensels. Rectangular sensing arrays are also possible, for example, 64 sensels×256 sensels, 256 sensels×512 sensels, or preferably 192 sensels×384 sensels.

Multiple tire sensors may also be combined to extend or enlarge the sensing area. For example, two 36"×36" sensors can be placed tightly side by side thereby doubling the available sensing area. In another example, four sensors are tightly placed in a 2×2 or 4×1 configuration to suit applications requiring larger sensing areas.

Tire sensors usually are flexible sensors but are generally mounted on a hard surface such as acrylic, PVC, ABS, polyurethane, wood, or preferably lexan plastic. The rigid base provides a smooth stable surface for taking tire tread measurements. However, it is possible to use tire sensors on uneven surfaces as well by removing the rigid backing surface.

Figure 2:
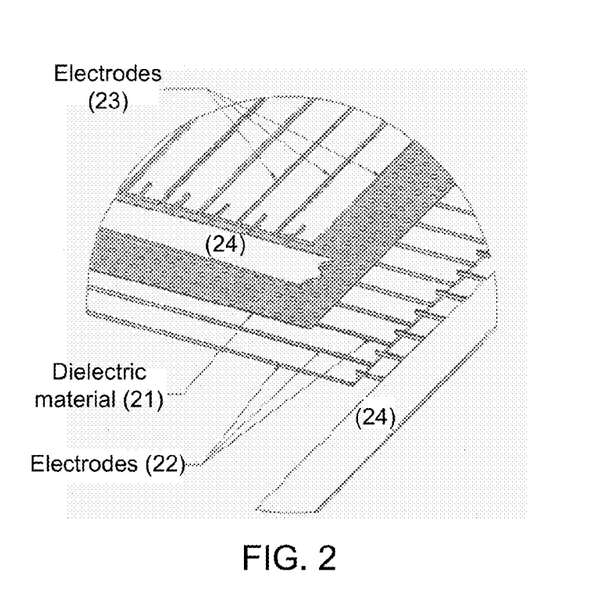
FIG. 2 is an exploded view of a capacitive pressure sensor.

Examples of tire pressure sensors (10) include resistive pressure sensors, fibre-optic pressure sensors, or preferably capacitive pressure sensors. FIG. 2 illustrates the construction of an example capacitive pressure sensor. The sensor includes column electrodes (23) onto which a sinusoidal electrical signal is injected and row electrodes (22) where an attenuated sinusoidal signal is detected. The row and column electrodes are constructed of strips of electrically conductive material such as copper strips, aluminum strips, tin strips, or preferably conductive fabric or flexible circuit. The row and column electrodes are separated by a compressible dielectric material (21) such that the dielectric compresses according to the pressure applied to the surface of the sensor. An electrical signal is injected on a column electrode and is then attenuated as it passes through the dielectric material to the row electrode where the attenuated signal may be detected. The attenuation of the signal depends on the amount of dielectric compression resulting from the applied pressure. The detected signal can be measured by the sensor electronics and converted to a pressure value using a calibration process. The row and column electrodes are connected to the sensor electronics using a ribbon cable (24) or other electrically conductive wiring harness, for example, discrete wires, conductive fabric, printed circuit board, or preferably, a flexible circuit.

SENSOR ELECTRONICS UNIT. An example sensor electronics unit shown in FIG. 3 includes a digital signal processor (DSP) (30), injection signal generation and control (32), (37), (35), signal detection and control (36), (37), (38), (34), a digital logic device (33), and a data communications interface (31).

Figure 3:
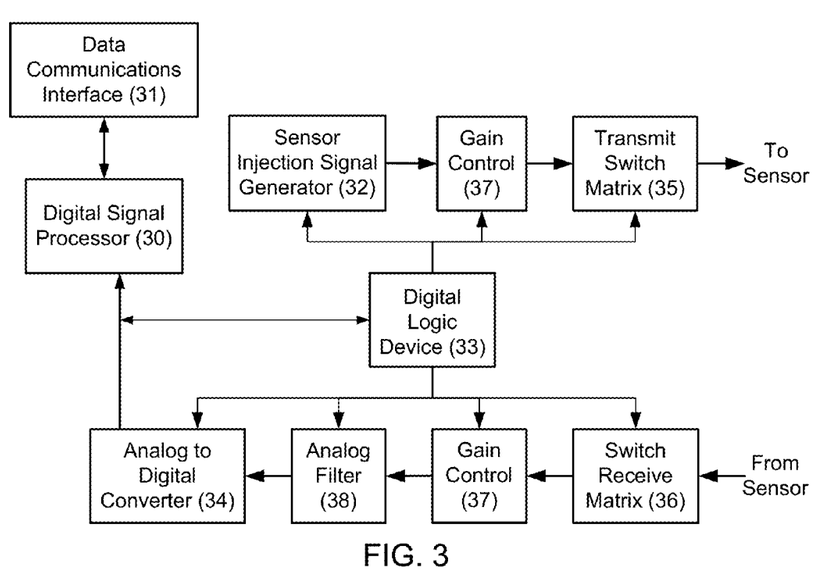
FIG. 3 is a block diagram of a sensor electronics unit.

The DSP (30) executes firmware that is designed to receive control messages from application software running on a PC via the data communications interface (31). The control messages include measurement requests that contain coordinates for an individual sensing element (sensel) within the pressure sensor array. The DSP (30) selects a column for the injection signal and a row for signal detection. The detected signal is then converted from analog to digital (34) for measurement processing by the DSP (30). The measurement is then passed back to the application software via the data communications interface (31).

The DSP (30) may be a standalone device or include external memory such as Random Access Memory (RAM), Read Only Memory (ROM), or any other commonly used memory device. Memory devices can be accessed either serially or via parallel data bus.

The sensor injection signal generation block (32) is an electronic device or circuit used to create a sinusoidal injection signal at a selectable frequency. The injection signal can be in the range of 50 Khz to 5 Mhz, or preferably 250 Khz or 100 Khz.

The gain control block (37) is an electronic device or circuit used to adjust the amplitude of the injection signal. The gain setting is controlled by the DSP (30) via the digital logic device (33). The amplified injection signal is connected to the transmit switch matrix (35). The DSP (30) configures the digital logic device (33) to enable the appropriate switch in the switch matrix in order to select a sensor column for transmitting the injection signal.

The injection signal passes through the pressure sensor and is detected on a row selected using the receive switch matrix (36). The sensor row is selected by the DSP (30) via the digital logic device (33) and the selected signal is connected to the gain control block (37) for amplification.

An analog filter (38) removes signal noise before the analog to digital converter (ADC) (34). The analog filter is an electronic device or circuit that acts as a band pass or low pass filter and only passes frequencies near the injection signal frequency. For example, if the injection signal has a frequency of 250 Khz, the filter only passes frequencies in the range of 200 Khz to 350 Khz and thereby rejects other interfering signals that are not within the pass band. The analog filter can be designed to accommodate pass bands of variable frequency spreads where tighter frequency spreads more effectively filter interfering signals.

The ADC (34) is periodically sampled by the DSP (30) in order to acquire sufficient samples for performing a measurement calculation. For example, 12, 24, 48, 96, or 192 samples can be acquired before performing a measurement calculation on the samples. The DSP (30) can also execute firmware to perform additional digital filtering in order to further reduce the frequency spread of the pass band and more effectively filter interfering signals. Digital filtering requires more samples from the ADC (34), for example 256, 1024, 2048, or preferably 512 samples.

The data communications interface (31) passes data between the DSP (30) and the application software running on a PC. The interface includes electronic devices or circuitry to perform wired or wireless communication. Examples of wired communication include RS232 serial, Universal Serial Bus (USB), Ethernet, fibre-optic, or any other serial or parallel data communication technology. Examples of wireless communication include, Zigbee, Bluetooth, WiFi, Wireless USB, or any other wireless data communication technology.

The digital logic device (33) includes electronic devices or circuitry, for example complex programmable logic devices (CPLD), field programmable gate arrays (FPGA), application specific integrated circuits (ASIC), or discrete logic devices.

APPLICATION SOFTWARE. In this example, the pressure mapping application software (13) runs on a standard computer device, for example, a desktop computer, laptop, pad computer, tablet, touch screen kiosk, personal data assistant, smart phone, handheld computer, server, or mainframe computer.

The application software (13) runs with a standard computer or embedded operating system (OS) (14) such as Linux, embedded Linux, NetBSD, WindowsCE, Windows embedded, Mac OS, iOS, Android, Windows8, QNX, Blackberry OS, or preferably, Windows7 or WindowsXP.

The application software performs basic functionality such as data messaging with the sensor electronics (11), conversion of measurements from the sensor electronics (11) to calibrated pressure values, display processing and control for the pressure map and user interface, calibration management and control, and numerous user-initiated advanced measurement processing and image processing techniques.

The application software performs a number of automated measurements that are derived from the pressure data. For example, center of pressure can be calculated for the entire pressure map or for smaller groups of sensels. In another example, average pressure can be calculated over the entire pressure map or within a smaller user selected area. In another example, contact area can be calculated within a pressure map by determining the number of sensels that are above a pressure threshold. In another example, a load calculation can be automatically performed using the pressure data and the contact area. Automated detection and measurement of tire tread specific data can also be performed.

TIRE TREAD ANALYSIS PROCESS. One task useful to automating tire tread measurements is to locate the tire tread within the pressure map and frame the tread area such that measurements can be made with a high degree of accuracy. In this way, automated tire tread measurements can be performed regardless of the orientation of the tire on the pressure sensor. For example, Groove Area Fraction (e.g., "ASTM F 870-94 (2005)") and Shoulder Center Ratio are two types of tread measurements that are commonly performed by a manual process, which preferably can be automated.

Figure 4:
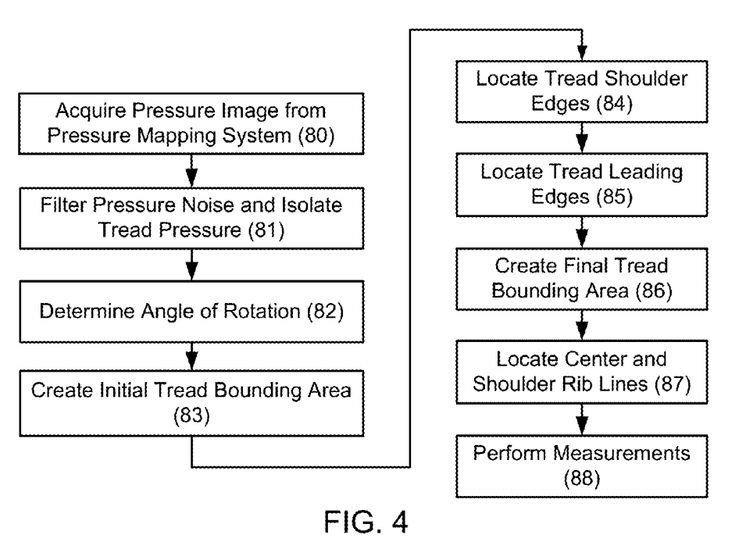
FIG. 4 is a flow diagram of a tire tread analysis process.

FIG. 4 summarizes one example of an automated tire tread analysis process. The steps shown in FIG. 4 are not required to be performed in the order shown. Noise is filtered (81) from the "active" pressure image (80). Then the tire tread is loosely framed (83) and the angle of rotation of the tire is determined (82). The frame around the tire tread is rotated (83) to align with the tread and tightened (84,85) until the frame is touching the "active" sensels of the tread (86). The tire tread ribs are located (87) using the frame coordinates and finally the automated measurements are performed (88).

TREAD FRAMING AND RIB LOCATION PROCESS. This tread analysis routine automates the framing of the tire tread contact area and the creation of rib length markers, lines that run the length of the tread rib. The tread framing algorithm uses heuristic information acquired from pressure map data to detect and frame a tire tread image regardless of its orientation in the pressure map.

ISOLATING TREAD PRESSURE MAP (80,81). The pressure map is recursively scanned to build a list of connected areas. A sensel is a single pressure sensor in a 2D array of pressure sensors know as the pressure map. A list of "active" sensels is created with pressures above a configurable threshold, for example, 5 mmHg.

Figure 5:
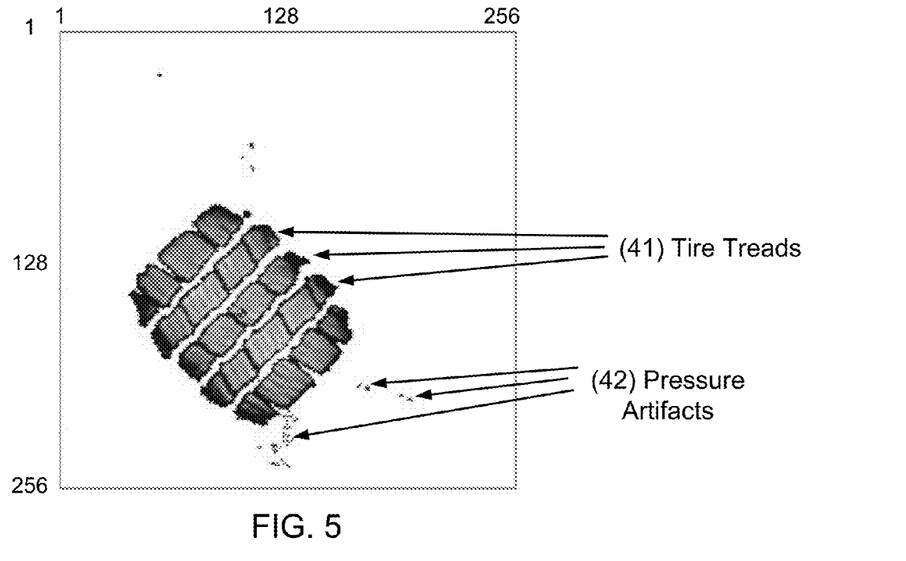
FIG. 5 is an illustration of a tire tread pressure map.

Pressure artifacts are filtered out by rejecting "active" sensels that are not grouped with other sensels to span a minimum width, for example four or more row or column sensels. Sensels are also rejected if row/column sensel area is less than some minimum, for example 30 sensels. FIG. 5 illustrates the difference between pressure artifacts (42) and valid tread pressures (41). For example, a "non-active" sensel remains white and therefore creates a white background in the pressure map of FIG. 5. (However, any background color may be used.) The remaining "active" sensels are processed to determine the min/max range for rows and columns and this information is used to determine the area of the sensor map to be used for further processing. This area is a bounding box that loosely frames the tire tread but is not yet aligned with the orientation of the tire tread.

Figure 6:
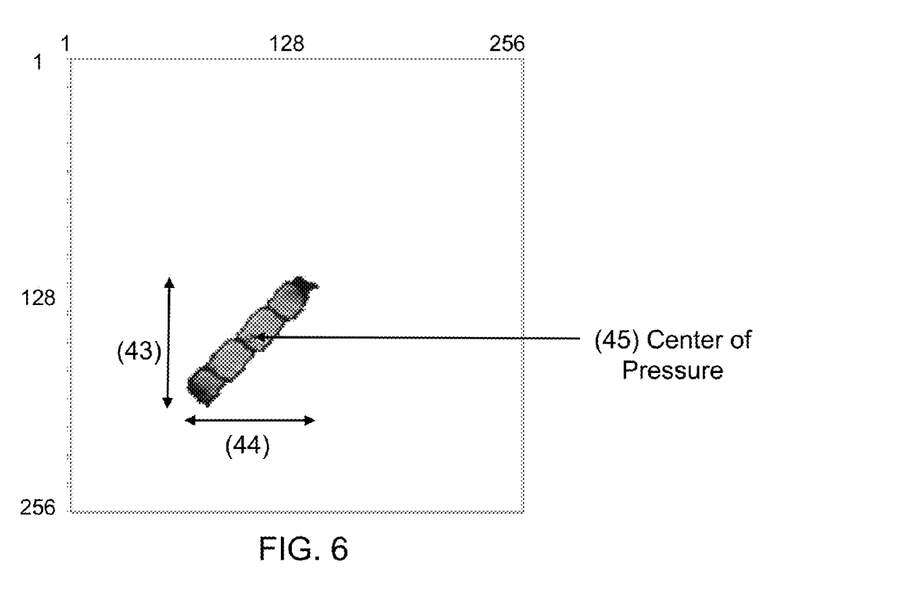
FIG. 6 is an illustration demonstrating how a tire tread's center rib is isolated and where the center of pressure is located within the center rib.

DETERMINING THE ANGLE OF ROTATION AND GENERAL DIRECTION OF THE TIRE (82). Individual "bands" of pressure are isolated and these "bands" correspond to the ribs of the tire tread. The "bands" of pressure are isolated using a process to group adjacent sensels. The "active" sensels that are adjacent in the row or column axis are grouped until there are no more adjacent sensels. This group of sensels forms the "band" of pressure. The "band" of pressure may contain sub groups of sensels if there are gaps between individual "active" sensel groups within the band of pressure. But the "band" of pressure is formed between the edges of the bounding box, thereby including all sensel sub groups. In FIG. 5 there are 5 ribs in the tread. In FIG. 6, the center of pressure (45) for the largest band of pressure is computed (in the form of fractional row and column coordinates) and the band of pressure associated with the center of pressure is isolated. The largest band of pressure is the one that contains the most active sensels. The number of sensels spanned by the band of pressure along the column axis (43) and the row axis (44) are then computed.

Figure 7:
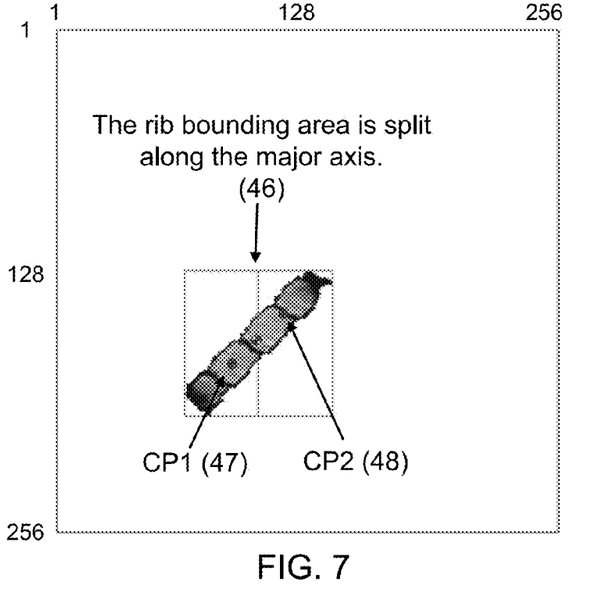
FIG. 7 is an illustration demonstrating how the center rib is split and center of pressure computed for each half of the rib.

The band of pressure is then split across its major axis through the center of pressure (45). The axis chosen is the greater of the column axis (43) or row axis (44). The size of the axis is determined by how many sensels are spanned by the "active" sensels in the "band" of pressure. In FIG. 7, the column axis (43) is selected as the major axis (46) since the column axis (43) spans more sensels than the row axis (44). The center of pressure is then located for each of the two halves of the "band" of pressure. The two additional centers of pressure are identified as CP1 (47) and CP2 (48) in FIG. 7.

Figure 8:
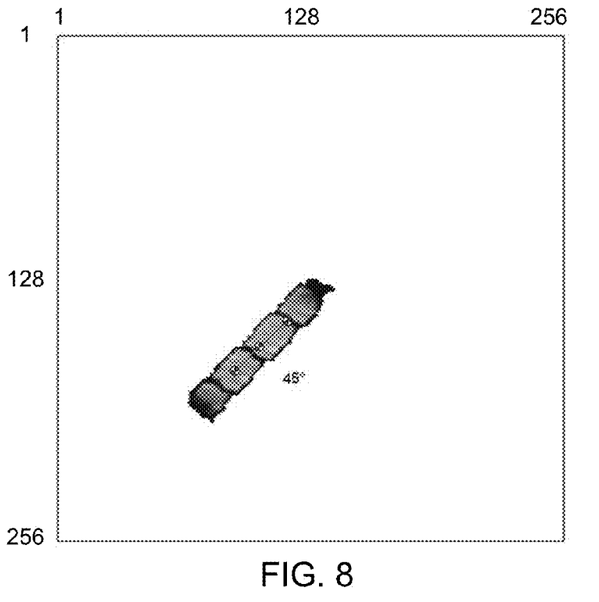
FIG. 8 is an illustration demonstrating how the tire tread's angle of rotation is computed.

Two vectors are then formed using the center of pressure coordinates. These vectors create a line that determines the angle of rotation of the tire tread rib as shown in FIG. 8. The angle of rotation for each vector is computed and the two angles are averaged to determine the rib's angle of rotation relative to the pressure sensor. In the example shown in FIG. 8, the angle of rotation is computed to be 45 degrees. The angle of rotation determines the orientation of the tire tread on the pressure sensor.

Figure 9:
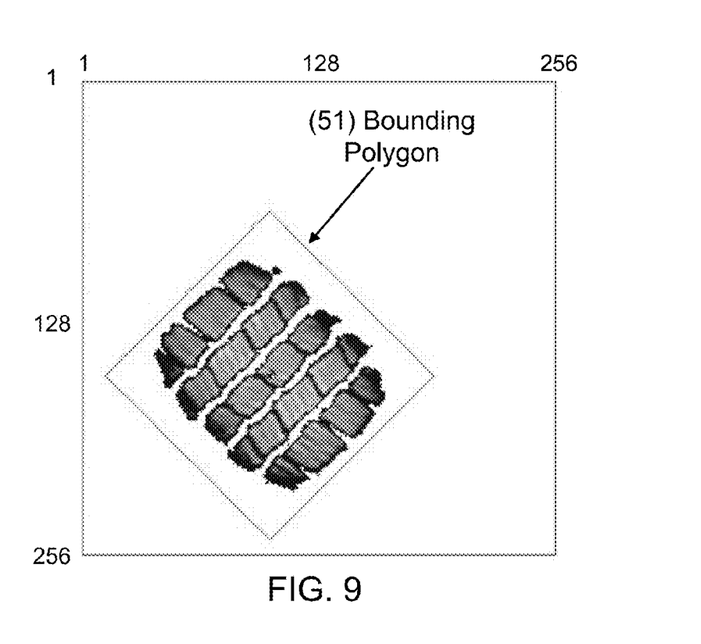
FIG. 9 is an illustration demonstrating how the tire tread is loosely framed by a bounding polygon.

CREATING A BOUNDING RECTANGLE (83). In FIG. 9, a bounding rectangle is created that encompasses the extents of all non-rejected pressure areas on the pressure map. The angle of rotation is applied to the bounding rectangle to create a four corner bounding polygon (51) that shares the same orientation as the tire and also encompasses all of the tire tread.

Figure 10:
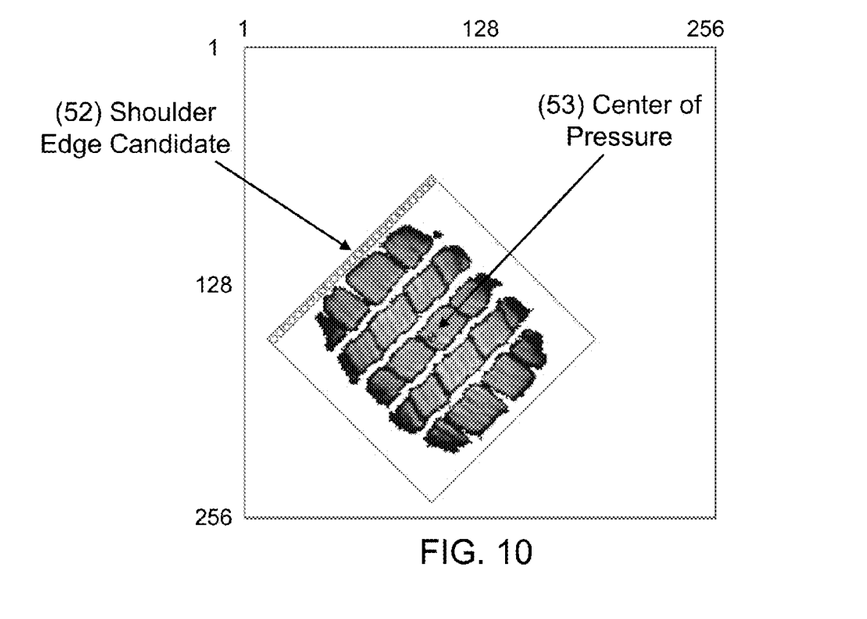
FIG. 10 is an illustration of the tire tread shoulder edge candidate.

FINDING THE SHOULDER EDGES AND LEADING EDGES (84,85,86). Using the appropriate corners from the bounding polygon, a sensel edge list between the corners is generated using Bresenham's line algorithm. In FIG. 10, the line formed by the sensel edge list (52) represents the first shoulder edge candidate. The shoulder edge candidate line is advanced towards the center of pressure (53).

Figure 11A:
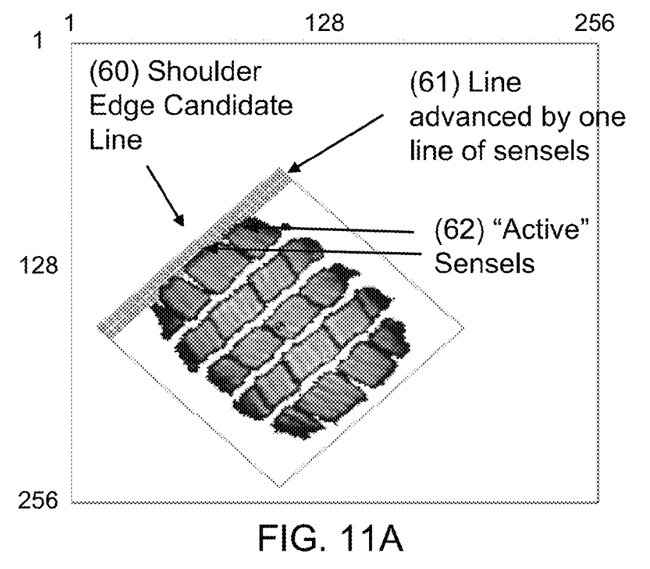
FIGS. 11A-D are illustrations demonstrating how the edge candidates are advanced until the tire tread is tightly framed by a bounding polygon.
Figure 11B:
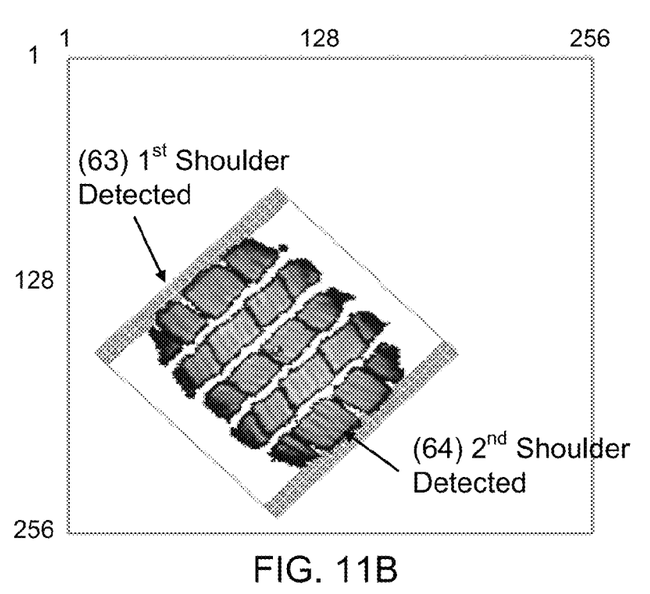

In FIG. 11A, the shoulder edge candidate line (60) is advanced by one line of sensels (61) and then the number of "active" sensels (62) touching the new line of sensels are counted. If over 10% of the sensels in the line of sensels are "active", then the corner sensels are considered to represent the shoulder edge coordinates. Otherwise, the shoulder edge candidate line is advanced again by one line of sensels. This continues until the shoulder edge is found (63), as shown in FIG. 11B. The same process is used to detect the shoulder edge (64) on the opposite side of the tire tread.

Figure 11C:
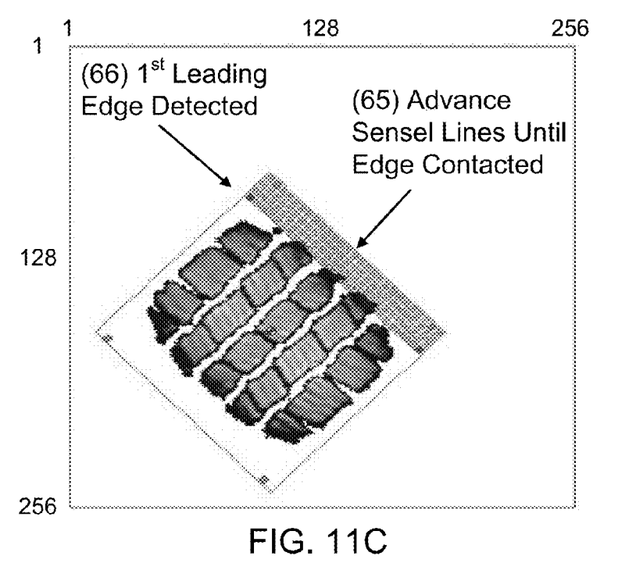
Figure 11D:
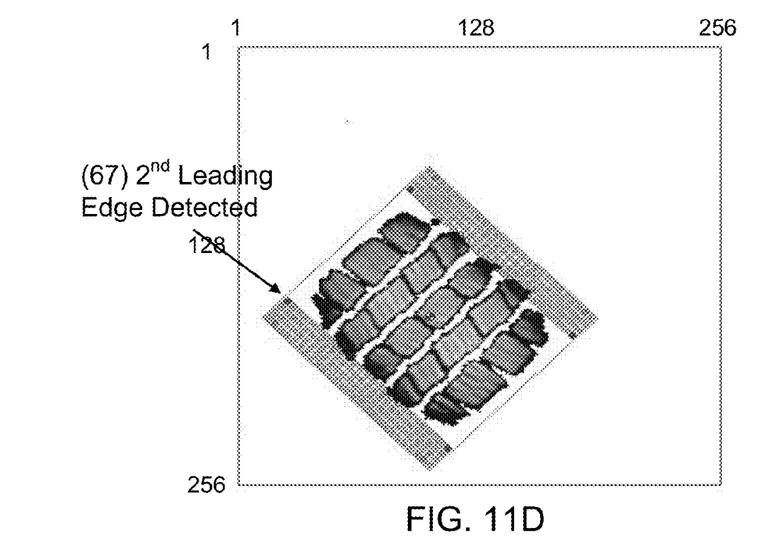

The same process is repeated to detect the leading edges of the tire tread. The leading edge candidate line is derived from the end coordinates of the shoulder edge sensel lines. As shown in FIG. 11C, the leading edge candidate line is advanced by one line of sensels (65) and then the number of "active" sensels touching the new line of sensels are counted. If over 10% of the sensels in the line are "active", then the corner sensels are considered to represent the leading edge coordinates. Otherwise, the shoulder edge candidate line is advanced again by one line of sensels. This continues until the leading edge is found (66). The same process is used to detect the leading edge (67) on the opposite side of the tire tread, as shown in FIG. 11D.

Figure 12:
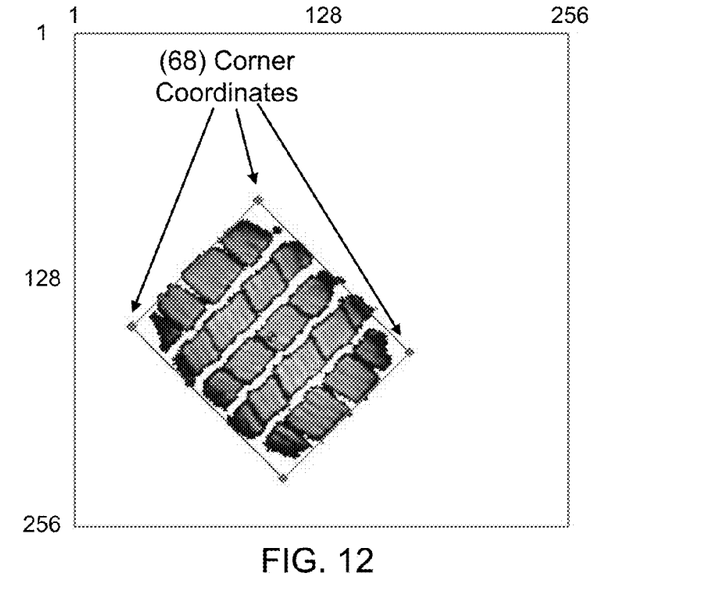
FIG. 12 is an illustration of the corner coordinates of the bounding polygon.

In FIG. 12, the corner coordinates (68) for the new bounding box around the tire tread are determined by the intersection of the shoulder edge lines and the leading edge lines. The tire tread is now framed and ready for measurement processing. This process is capable of successfully framing the tread regardless of the orientation of the tread relative to the sensor. In an alternate approach, the tire tread can be framed using a manual process.

Figure 13:
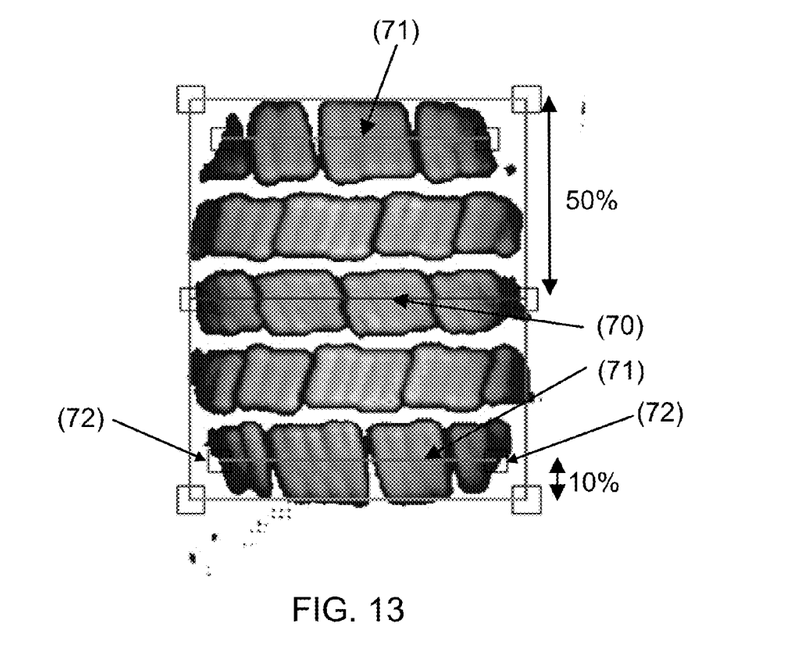
FIG. 13 is an illustration demonstrating the creation of the center rib line and shoulder rib lines.

COMPUTING THE CENTRAL RIB LINE AND SHOULDER RIB LINES (87). In FIG. 13, the central rib line (70) is drawn between the mid-points of each leading edge line. If there are not an even number of tread ribs or the center rib is not aligned to the middle of the tread, then a center line can still be drawn between the mid-points of the leading edge lines. Returning to the example of FIG. 13, each shoulder rib line (71) is initially drawn between the leading edge lines at a point that is 10% of the leading edge line length from the shoulder edge line. The shoulder rib lines are then shortened until the end of the segment is contacting "active" sensels at each end (72). This compensates for the curvature of the tire at the shoulder edges.

Figure 14:
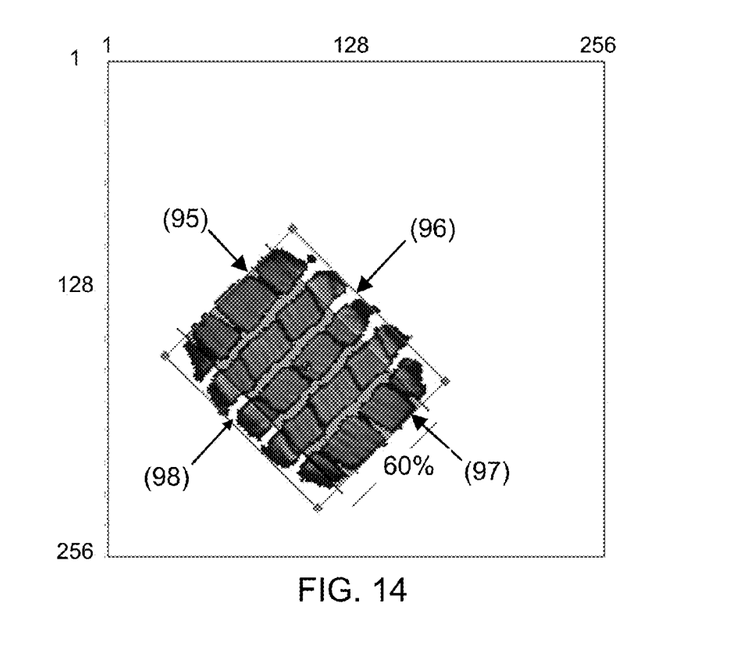
FIG. 14 is an illustration demonstrating the Groove Area Fraction measurement.

GROOVE AREA FRACTION MEASUREMENT (88). One example of an automated measurement is the Groove Area Fraction measurement. This is the ratio of contact area to the groove space between the treads. The Groove-Area Fraction, "ASTM F 870. 94 (2005)", is computed using the middle 60% area of the tire footprint. In FIG. 14, the middle 60% area includes all the space between the two shoulder edges (95) and (97), and two newly computed lines that run between the shoulders and start 20% from the leading edges (96) and (98).

The contact area of the polygon encircling the middle 60% is calculated (the gross contact area), and the contact area of the entire tire tread is calculated (the footprint area). The groove-area fraction is the ratio of the footprint area to the gross contact area.

Figure 15:
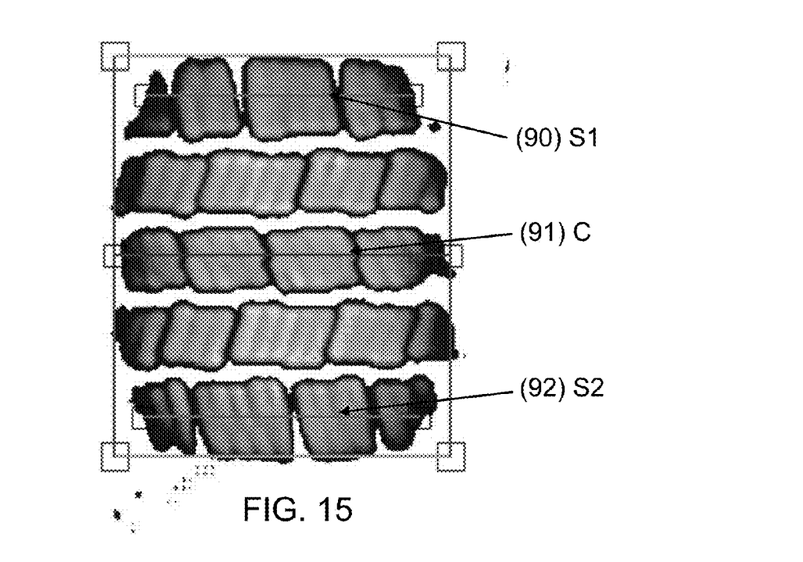
FIG. 15 is an illustration demonstrating the Shoulder Center Ratio measurement.

SHOULDER CENTER RATIO MEASUREMENT (88). Another example of an automated measurement is the Shoulder Center Ratio. This is the ratio of the length of a shoulder rib to the length of the central rib, or center line, of the tire. In FIG. 15, the first shoulder ratio is the length of shoulder rib S1 (90), divided by the length of the center rib, or center line, C (91). Similarly, the second shoulder ratio is the length of shoulder rib S2 (92) divided by the length of the center rib, or center line, C (91).

Figure 16:
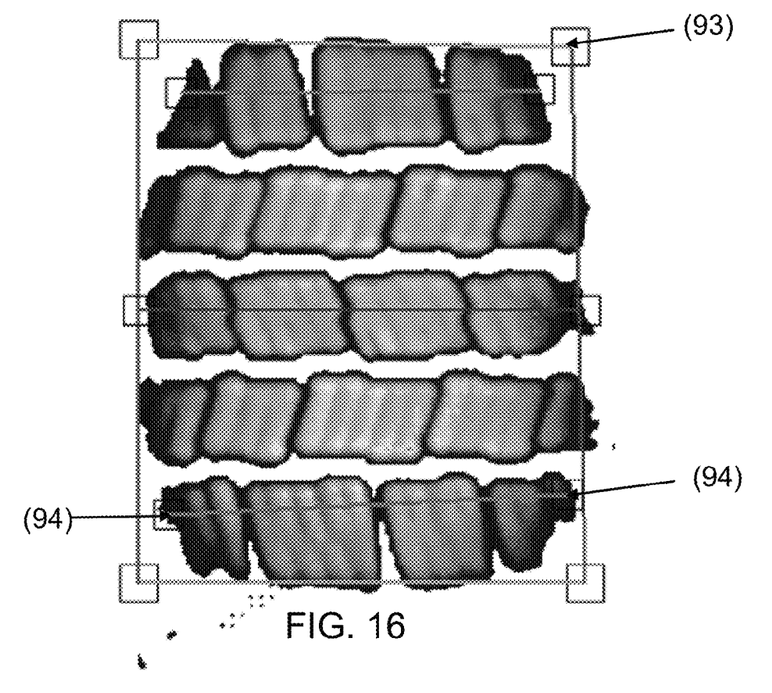
FIG. 16 is an illustration demonstrating manual adjustments to the bounding polygon and shoulder rib line.

USER ADJUSTMENTS AND AUTOMATED MEASUREMENT. As previously described, the tire tread in the pressure map is automatically framed and automated measurements are performed instantly. The user can also be given the ability to manually adjust the corner coordinates of the polygon that frames the tire tread as well as the end point coordinates of the rib lines. This can be done by a click and drag process. In FIG. 16, the user has adjusted the top right corner coordinates (93) of the polygon that frames the tire tread. The user has also adjusted the lower shoulder rib coordinates (94) to resize the shoulder rib line. The Groove Area Fraction and Shoulder Centre Ratio measurements are automatically updated based on the user adjusted coordinates.

AUTOMATED MEASUREMENT VARIATIONS. The process described for automating the example measurements, Groove Area Fraction and Shoulder Centre Ratio, can be applied to other automated measurements that isolate the tire tread data within the pressure map. For example, peak and average contact pressures can be measured for each individual rib in the tire tread, contact area can be measured for each individual rib in the tire tread, rib measurements can be performed for all ribs and ratios calculated between ribs, contact area to groove space ratios can be calculated for separate halves or quarters of the tire tread, pressure distributions can be calculated and displayed for each rib, load calculations can be performed for the entire tread or individual ribs, and other ratios comparing physical parameters such as contact area or average pressure can be performed for the tread, individual ribs, or other distinct features of the tire tread.

Any measurement taken using the tire tread analysis process can be performed on a single frame, multiple selected frames, or continuously. For example, a tire can be rolled across the pressure sensor in an arc to simulate cornering and the measurements can be performed on each frame in a continuous fashion. The automated measurements can then be examined on a frame by frame basis or can be averaged over a number of frames, or the entire recorded session, in order to further analyze the data. Other statistical analysis can be performed on frames of data in order to better understand the performance of the tire tread.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A computer-implemented method for measuring a physical parameter for a tire tread comprising a computer system automatically performing the steps of:
    measuring a pressure distribution produced by a tire on a pressure sensor, the pressure sensor having an array of individual pressure sensing elements; and
    processing a pressure map based on the measured pressure distribution to determine a physical parameter for the tire tread, wherein the pressure map comprises sensels, and the step of processing the pressure map comprises removing artifacts from the pressure map based on which sensels within the pressure map are above a threshold pressure.

2. The method of claim 1 wherein the physical parameter is groove area fraction.

3. The method of claim 1 wherein the physical parameter is shoulder center ratio.

4. The method of claim 1 wherein the physical parameter is a function of tread area.

5. The method of claim 1 wherein the physical parameter is a function of a feature of a tread contact area.

6. The method of claim 1 wherein the pressure distribution is measured when the tire is resting on the pressure sensor.

7. The method of claim 1 wherein the pressure distribution is measured as the tire is traversing the pressure sensor.

8. The method of claim 1 wherein the step of processing the pressure map comprises:

identifying at least one feature of the tire tread; and calculating the physical parameter using the identified feature.

9. The method of claim 8 further comprising:

receiving a user adjustment of one of the identified features; and calculating the physical parameter using the adjusted identified feature.

10. The method of claim 1 wherein the step of processing the pressure map comprises framing the tire tread with a bounding box.

11. The method of claim 1 wherein the step of processing the pressure map comprises determining an angle of orientation of the tire tread relative to the pressure sensor.

12. A system for measuring a physical parameter for a tire tread, comprising:

a pressure sensor having an array of individual pressure sensing elements, the pressure sensor measuring a pressure distribution produced by the tire on the pressure sensor;

a sensor electronics unit in communication with the pressure sensor, the sensor electronics unit receiving the pressure distribution measurements from the pressure sensor; and a computer in communication with the sensor electronics unit, the computer processing a pressure map based on the measured pressure distribution to determine a physical parameter for the tire tread, wherein the pressure map comprises sensels, and the computer processes the pressure map comprises removing artifacts from the pressure map based on which sensels within the pressure map are above a threshold pressure.

13. The system of claim 12 wherein the pressure sensor is a capacitive pressure sensor.

14. The system of claim 13 wherein the sensor electronics unit injects a sinusoidal electrical signal to an individual pressure sensing element in the capacitive pressure sensor and detects the signal after passing through the individual pressure sensing element.

15. The system of claim 12 wherein the computer processing the pressure map comprises:

identifying at least one feature of the tire tread; and calculating the physical parameter using the identified feature.

16. The system of claim 12 wherein the computer processing the pressure map comprises framing the tire tread with a bounding box.

17. The system of claim 12 wherein the computer processing the pressure map comprises determining an angle of orientation of the tire tread relative to the pressure sensor.

18. A computer-implemented method for measuring a physical parameter for a tire tread comprising a computer system automatically performing the steps of:

measuring a pressure distribution produced by a tire on a pressure sensor, the pressure sensor having an array of individual pressure sensing elements; and processing a pressure map based on the measured pressure distribution to determine a physical parameter for the tire tread, wherein the step of processing the pressure map comprises: identifying at least one feature of the tire tread, and calculating the physical parameter using the identified feature; and wherein the step of identifying at least one feature of the tire tread comprises identifying bands of pressure that correspond to ribs in the tire tread.

19. A computer-implemented method for measuring a physical parameter for a tire tread comprising a computer system automatically performing the steps of:

measuring a pressure distribution produced by a tire on a pressure sensor, the pressure sensor having an array of individual pressure sensing elements; and processing a pressure map based on the measured pressure distribution to determine a physical parameter for the tire tread, wherein the step of processing the pressure map comprises: identifying at least one feature of the tire tread, and calculating the physical parameter using the identified feature; and wherein the step of identifying at least one feature of the tire tread comprises identifying a center line of the tire tread.

20. A computer-implemented method for measuring a physical parameter for a tire tread comprising a computer system automatically performing the steps of:

measuring a pressure distribution produced by a tire on a pressure sensor, the pressure sensor having an array of individual pressure sensing elements; and processing a pressure map based on the measured pressure distribution to determine a physical parameter for the tire tread, wherein the step of processing the pressure map comprises: identifying at least one feature of the tire tread, and calculating the physical parameter using the identified feature; and wherein the step of identifying at least one feature of the tire tread comprises identifying a shoulder rib line of the tire tread.

* * * * *